United States Patent
Elwart et al.

(10) Patent No.: US 10,253,714 B2
(45) Date of Patent: Apr. 9, 2019

(54) STOP/START CONTROL BASED ON REPEATED DRIVING PATTERNS

(71) Applicant: FORD GLOBAL TECHNOLOGIES, LLC, Dearborn, MI (US)

(72) Inventors: Shane Elwart, Ypsilanti, MI (US); Sudipto Aich, Ann Arbor, MI (US); Jamel Seagraves, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1597 days.

(21) Appl. No.: 13/897,576

(22) Filed: May 20, 2013

(65) Prior Publication Data
US 2014/0343830 A1    Nov. 20, 2014

(51) Int. Cl.
F02D 41/24    (2006.01)
F02N 11/08    (2006.01)

(52) U.S. Cl.
CPC .......... *F02D 41/24* (2013.01); *F02N 11/0818* (2013.01); *F02N 11/0837* (2013.01); *F02N 2200/123* (2013.01); *F02N 2200/125* (2013.01); *F02N 2300/2004* (2013.01); *F02N 2300/2008* (2013.01); *Y02T 10/48* (2013.01)

(58) Field of Classification Search
CPC ....... F02N 11/0814–11/0844; F02N 2200/125; F02N 2300/2004; F02N 2300/2008; F16H 2312/14; B60W 30/18018; G08G 1/096888; F02D 41/24
USPC ........................................ 701/112; 123/179.4
See application file for complete search history.

(56) References Cited

U.S. PATENT DOCUMENTS

| | | | |
|---|---|---|---|
| 4,192,279 A | 3/1980 | Maisch et al. | |
| 5,451,820 A | 9/1995 | Gotoh et al. | |
| 6,275,759 B1 | 8/2001 | Nakajima et al. | |
| 6,335,700 B1 * | 1/2002 | Ashihara | G01S 7/4004 342/117 |
| 6,401,012 B1 * | 6/2002 | Aoki | G07F 5/18 700/231 |
| 6,526,931 B1 | 3/2003 | Vilou | |
| 6,675,088 B2 * | 1/2004 | Miki | F02D 41/042 123/198 DB |
| 2003/0087724 A1 * | 5/2003 | Seibertz | B60K 6/48 477/92 |
| 2007/0245997 A1 * | 10/2007 | Levasseur | F02N 11/0822 123/179.4 |
| 2010/0175936 A1 * | 7/2010 | Schneider | B60W 10/06 180/65.28 |
| 2011/0153127 A1 * | 6/2011 | Weslati | B60W 50/085 701/22 |

FOREIGN PATENT DOCUMENTS

JP    2004-169664 A    *    6/2004
JP    2007085777 A         4/2007

* cited by examiner

*Primary Examiner* — Mahmoud Gimie
*Assistant Examiner* — Joshua Campbell
(74) *Attorney, Agent, or Firm* — David Kelley; Brooks Kushman P.C.

(57) ABSTRACT

A method or system for controlling a vehicle having auto stop and auto start functions includes selectively inhibiting or disabling the auto stop or auto start functions in response to a detected vehicle position relative to an automatically learned vehicle route. The vehicle route is learned in response to previous drive cycles.

10 Claims, 4 Drawing Sheets

STOP/START CONTROL BASED ON REPEATED DRIVING PATTERNS

TECHNICAL FIELD

This disclosure relates to vehicles having an engine with automatic stop/start and inhibiting activities associated with engine shutdown prior to vehicle stop.

BACKGROUND

Vehicles may be equipped with an engine automatic start/stop function to automatically stop the engine under certain driving situations, and then automatically restart the engine in anticipation of vehicle movement. Automatic stopping and starting of the engine may be used to conserve fuel. For example, the auto stop function may be engaged when the vehicle is stopped rather than permitting the engine to idle. The engine may be restarted when the driver releases the brake or actuates the accelerator.

The vehicle may include logic to anticipate desired vehicle movement and trigger an engine start so that the vehicle is responsive to the driver. In one prior art implementation, if a driver stops the vehicle, the engine will shut down after some time. If the driver then decides to shut down the vehicle, he may shift the vehicle into "park." However, this may trigger an engine restart to prepare for subsequent selection of "reverse".

SUMMARY

An embodiment of a system or method for controlling a vehicle having auto stop and auto start functions according to the present disclosure comprises selectively disabling the auto stop or auto start functions in response to a detected vehicle position relative to an automatically learned vehicle route. The vehicle route is learned in response to previous drive cycles.

In some embodiments, the vehicle route comprises a location where the vehicle has previously crossed a detected stream of traffic. In such an embodiment, the selective disabling comprises disabling the auto stop function in response to a detected vehicle approach to the location where the vehicle has previously crossed a detected stream of traffic. In one such embodiment, the location where the vehicle has previously crossed a detected stream of traffic may be a location where the vehicle has previously detected oncoming traffic and made a left turn. In another embodiment, the location where the vehicle has previously crossed a detected stream of traffic is an intersection where the vehicle has previously detected cross traffic.

In other embodiments of the method, the vehicle route comprises a vehicle parking location at a second vehicle stop that is subsequent to a first vehicle stop. In such an embodiment, the selective inhibiting or disabling may comprise disabling the auto start function prior to a transmission being shifted out of gear in response to a detected vehicle location at the second vehicle stop. In such an embodiment, the inhibiting of the auto start function may be further in response to a detected vehicle proximity to a barrier or wall. Vehicle proximity to a barrier or wall may be detected using RADAR or LiDAR. The inhibiting of the auto start function may be further in response to the second vehicle stop being a learned distance from the first vehicle stop, where the learned distance is based on driving history. In such an embodiment, the method may further comprise measuring the distance between the first vehicle stop and the second vehicle stop using a vehicle odometer. In other embodiments where the vehicle route comprises a vehicle parking location at a second stop that is subsequent to a first vehicle stop, the selective disabling comprises disabling the auto stop function in response to a detected vehicle location at the second stop.

An embodiment of a system for controlling an internal combustion engine according to the present disclosure comprises a controller that is configured to automatically learn a vehicle route based on previous drive cycles. The system further comprises a stop/start system that is programmed to selectively disable at least one of an auto stop function and an auto start function in response to a detected vehicle position relative to the vehicle route.

In some embodiments of the system, the vehicle route comprises a location where the vehicle has previously crossed a detected stream of traffic. In such an embodiment, the selective disabling comprises disabling the auto stop function in response to a detected vehicle approach to the location where the vehicle has previously crossed a detected stream of traffic. In such an embodiment, the location where the vehicle has previously crossed a detected stream of traffic may be a location where the vehicle has previously detected oncoming traffic and made a left turn. In another embodiment, the location where the vehicle has previously crossed a detected stream of traffic is an intersection where the vehicle has previously detected cross traffic.

In other embodiments of the system, the vehicle route comprises a vehicle parking location at a second vehicle stop that is subsequent to a first vehicle stop. In such an embodiment, the selective disabling may comprise disabling the auto start function prior to a transmission being shifted out of gear in response to a detected vehicle location at the second stop. In such an embodiment, the inhibiting of the auto start function may be further in response to a detected vehicle proximity to a wall. The inhibiting of the auto start function may be further in response to the second vehicle stop being a learned distance from the first vehicle stop, where the learned distance is based on driving history. In such an embodiment, the stop/start system may be further configured to measure the distance between the first vehicle stop and the second vehicle stop using a vehicle odometer.

One embodiment of a system or method for controlling a start/stop vehicle according to the present disclosure comprises selectively disabling an auto stop function or an auto start function in response to a detected vehicle presence at a learned location, where the location is automatically learned in response to a pattern of sensor inputs received during at least one previous drive cycle.

Embodiments according to the present disclosure provide a number of advantages. For example, various embodiments may prevent unnecessary engine restarts and improve fuel economy and reduce wear of engine components. Other embodiments prevent engine auto stops in situations where a driver may need quick acceleration or turning control.

The above advantages and other advantages and features of the present disclosure will be readily apparent form the following detailed description of the preferred embodiments when taken in connection with the accompanying drawings.

DETAILED DESCRIPTION

Figure 1:
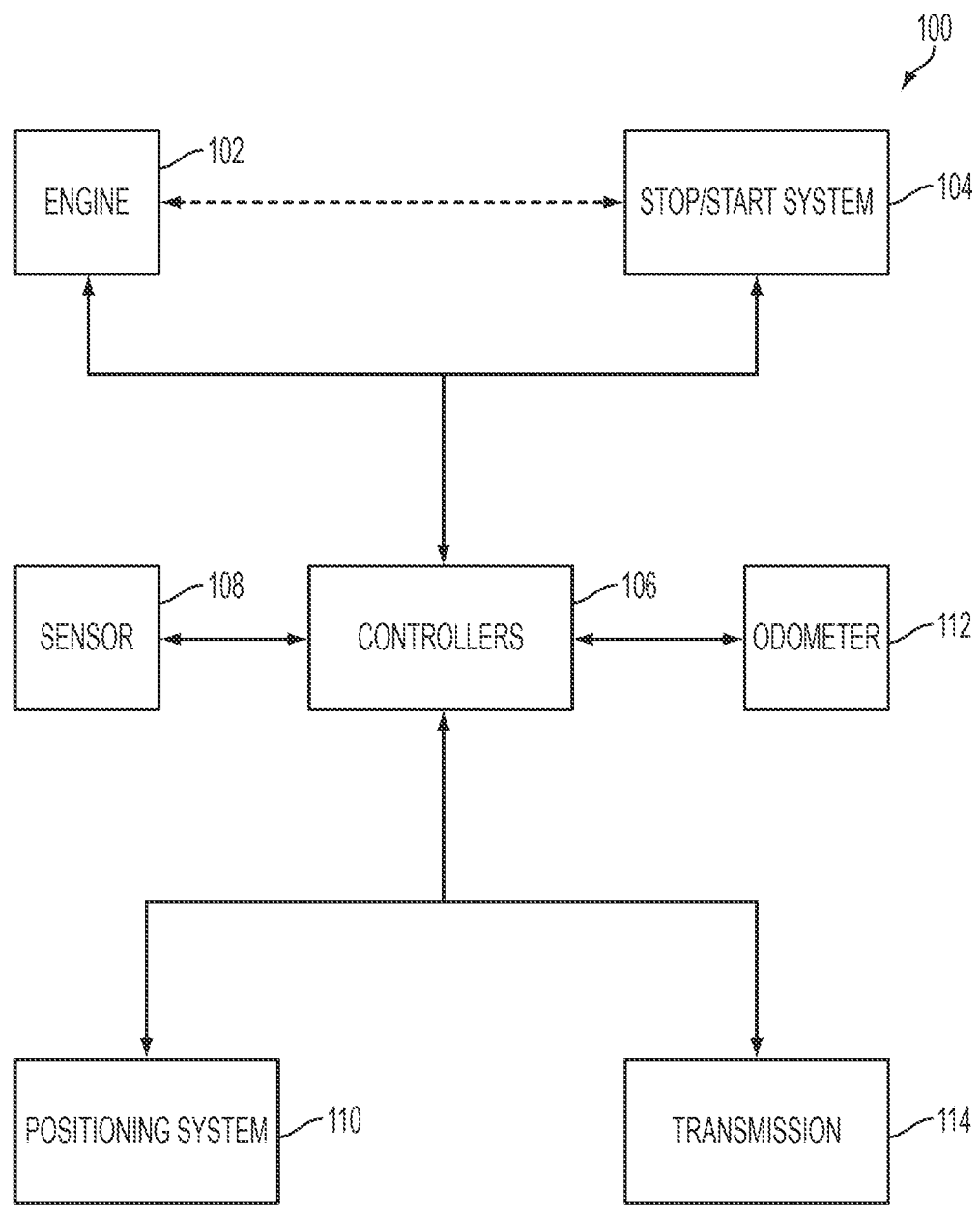
FIG. 1 is a block diagram of a stop/start vehicle according to the present disclosure.

As required, detailed embodiments are described herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1-5b, a system and method for controlling a stop/start vehicle will be described. For ease of illustration and to facilitate understanding, like reference numerals have been used for similar components and features throughout the drawings.

As those of ordinary skill in the art will understand, various features of the present invention as illustrated and described with reference to any of the Figures may be combined with features illustrated in one or more other Figures to produce embodiments of the preset disclosure that are not explicitly illustrated or described. The combinations of features illustrated provide representative embodiments for typical applications. However, various combinations and modifications of the features consistent with the teachings of the present disclosure may be desired for particular applications or implementations.

Stop/start vehicles, sometimes referred to as micro hybrid vehicles, are powered by conventional internal combustion engines and equipped with a stop/start system controlling auto stop and auto start functions. The stop/start system may auto stop the engine when the vehicle is stopped and the engine is not required for propulsion or other purposes. At a later time, the stop/start system may auto start the engine when required for propulsion or other purposes. By disabling the engine when possible, overall fuel consumption is reduced. Unlike true hybrid vehicles, stop/start vehicles are usually not capable of pure electric propulsion. Furthermore, unlike true hybrid vehicles, stop/start vehicles are generally not equipped with a traction battery, but rather with a conventional starting, lighting, and ignition (SLI) battery.

Controllers may initiate an auto stop or auto start of the engine according to a stop/start algorithm. As the vehicle comes to a stop, for example, or after the vehicle has been stopped for a predetermined time, the controllers may issue a command to begin the process of stopping the engine. As the brake pedal is disengaged (and/or the accelerator pedal is engaged) after an engine auto stop, the controllers may issue a command to begin the process to start the engine. Auto starts may also be initiated in response to signals from other vehicle systems. As an example, if the stop/start system has auto stopped the engine while the transmission is in Drive, if the transmission is shifted out of Drive the stop/start system may issue a command to auto start the engine.

The basic stop/start behavior described above may save fuel when compared with a traditional internal combustion engine vehicle. However, in some situations it is preferable for the engine to not auto stop when the default stop/start algorithm would ordinarily issue an auto stop command. For example, when a stop/start vehicle stops and waits for a gap in a stream of traffic, the engine will ordinarily be auto stopped after a predetermined delay. When the driver actuates the accelerator pedal to cross the stream of traffic, there may be a noticeable delay if the engine must be auto started. This may detract from driver satisfaction, especially when small breaks in traffic necessitate rapid vehicle acceleration.

Similarly, there are some situations in which it is preferable for the engine not to auto start when the engine would ordinarily be auto started according to the stop/start logic. For example, when a vehicle has reached its final destination, if the engine is auto stopped before the driver shifts the transmission out of Drive, the engine would normally be auto started when the gear lever is moved. However, because the vehicle has reached its final destination, the driver will most likely turn the vehicle off shortly thereafter. Initiating an auto start in this situation is unnecessary.

Certain embodiments of the systems and methods disclosed herein may selectively disable or inhibit the auto stop or auto start functions of an engine in situations where the default stop/start logic leads to unsatisfactory behavior. This selective disabling is performed based on learned driving routes and patterns of sensor inputs based on previous drive cycles. The driving routes may be learned in response to driving a route or encountering the pattern of sensor inputs a threshold number of times. Sensor inputs may include a driver override of the start/stop system from a button, knob, switch, or other user interface.

With reference to FIG. 1, a schematic representation of a vehicle 100 having auto stop functionality is shown. The vehicle 100 includes an engine 102 and a stop/start system 104 that controls the engine 102, as indicated by the dashed line. The vehicle further includes at least one controller 106 that controls or is in communication with engine 102 and stop/start system 104. In some embodiments, controllers 106 may be incorporated into stop/start system 104.

Vehicle 100 further includes at least one sensor 108, positioning system 110, odometer 112, and transmission 114, all of which are in communication with or under the control of controllers 106. In some embodiments, sensor 108 includes a LiDAR or RADAR system. Sensor 108 may also include an optical camera, or an auto start/stop override selector. In one configuration, the positioning system 110 may be a manufacturer-installed or aftermarket in-vehicle GPS system. In another configuration, the positioning system 110 may comprise a location-enabled mobile device such as a cellular phone or other standalone GPS unit. Other configurations are, of course, also possible.

The stop/start system 104 may issue auto stop commands and auto start commands to the engine 102 during vehicle operation. The stop/start system 104, for example, comprises a base auto stop/start logic that issues auto stop commands and auto start commands based on signals from sources including at least a speed sensor, accelerator pedal, and brake pedal (not shown), along with transmission 114.

In short, the engine 102 will be shut down in response to an auto stop command and will be restarted in response to an auto start command.

Figure 2:
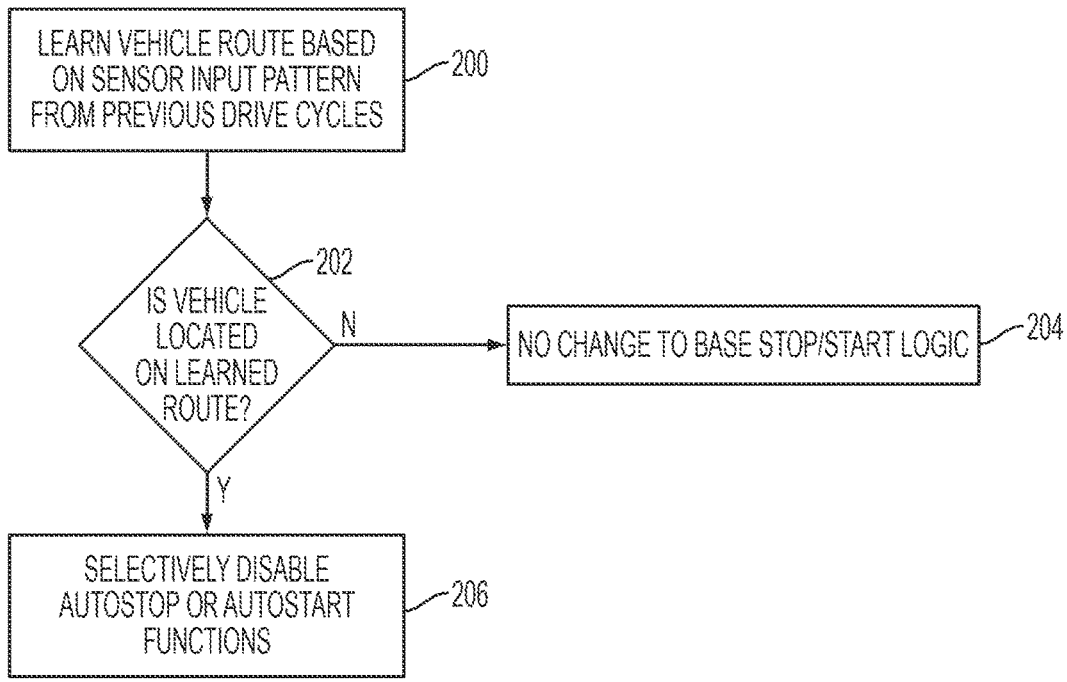
FIG. 2 is a flowchart illustrating one embodiment of a system or method for controlling a start/stop vehicle in response to a learned vehicle route according to the present disclosure.

With reference to FIGS. 1 and 2, a vehicle route is learned based on a pattern of sensor inputs from previous drive cycles, as illustrated in block 200. The sensor inputs may be from sensor 108, positioning system 110, odometer 112, or other vehicle sensors as appropriate. A determination is then made of whether the vehicle is located on a learned route, as illustrated in block 202. This determination may be made by controllers 106. If no, then the base stop/start logic is left unchanged, as illustrated in block 204. If yes, then the auto stop function or auto start function is selectively inhibited or disabled, as illustrated in block 206. This may be performed by stop/start system 104 in response to a signal from controllers 106. Various other embodiments of the system or method are described below.

Figure 3:
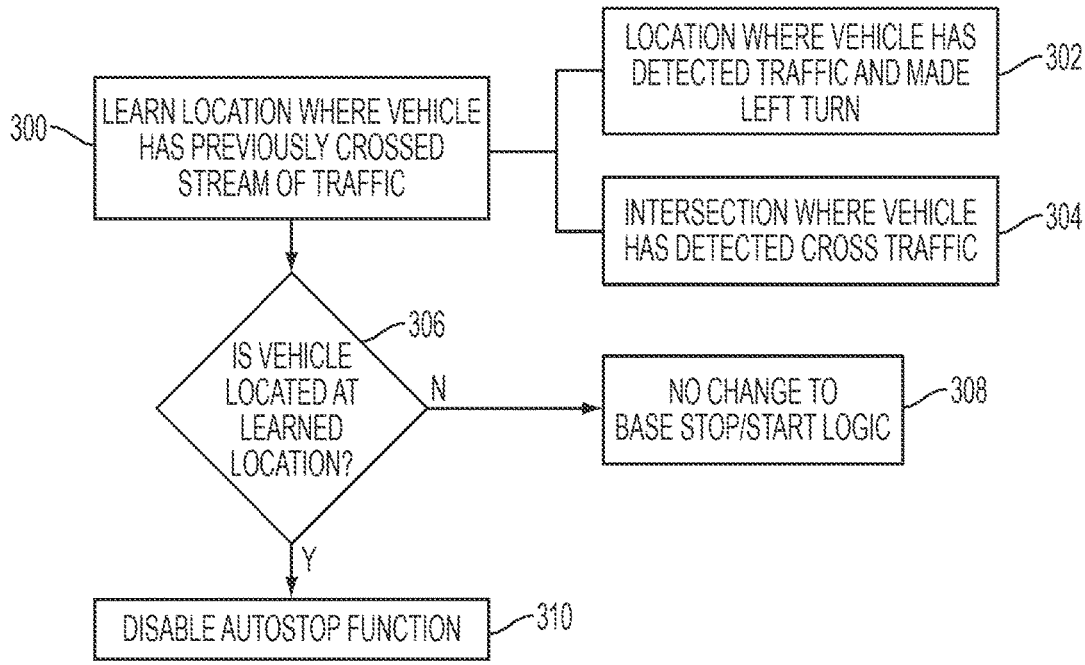
FIG. 3 is a flowchart illustrating one embodiment of a system or method for controlling a start/stop vehicle in response to a learned vehicle route that includes a location where the vehicle has previously crossed a stream of traffic according to the present disclosure.

With reference to FIGS. 1 and 3, a vehicle route is learned, including a location where the vehicle has previously crossed a stream of traffic, as illustrated in block 300. Examples of such a location include a location where the vehicle has detected traffic and made a left turn, as illustrated in block 302, or an intersection where the vehicle has detected cross traffic. The presence of oncoming or cross traffic may be detected by sensor 108, and the location may be detected by positioning system 110. Then, a determination is made of whether the vehicle is located at a learned location, as illustrated in block 306. This may be performed by comparing the present vehicle location, as detected by positioning system 110, against a database of locations learned according to block 300. If the vehicle is not in such a location, then the base stop/start logic is left unmodified as illustrated in block 308. If the vehicle is in such a location, the auto stop function is disabled, as illustrated in block 310. This may be performed by stop/start system 104 in response to a signal from controllers 106.

Figure 4:
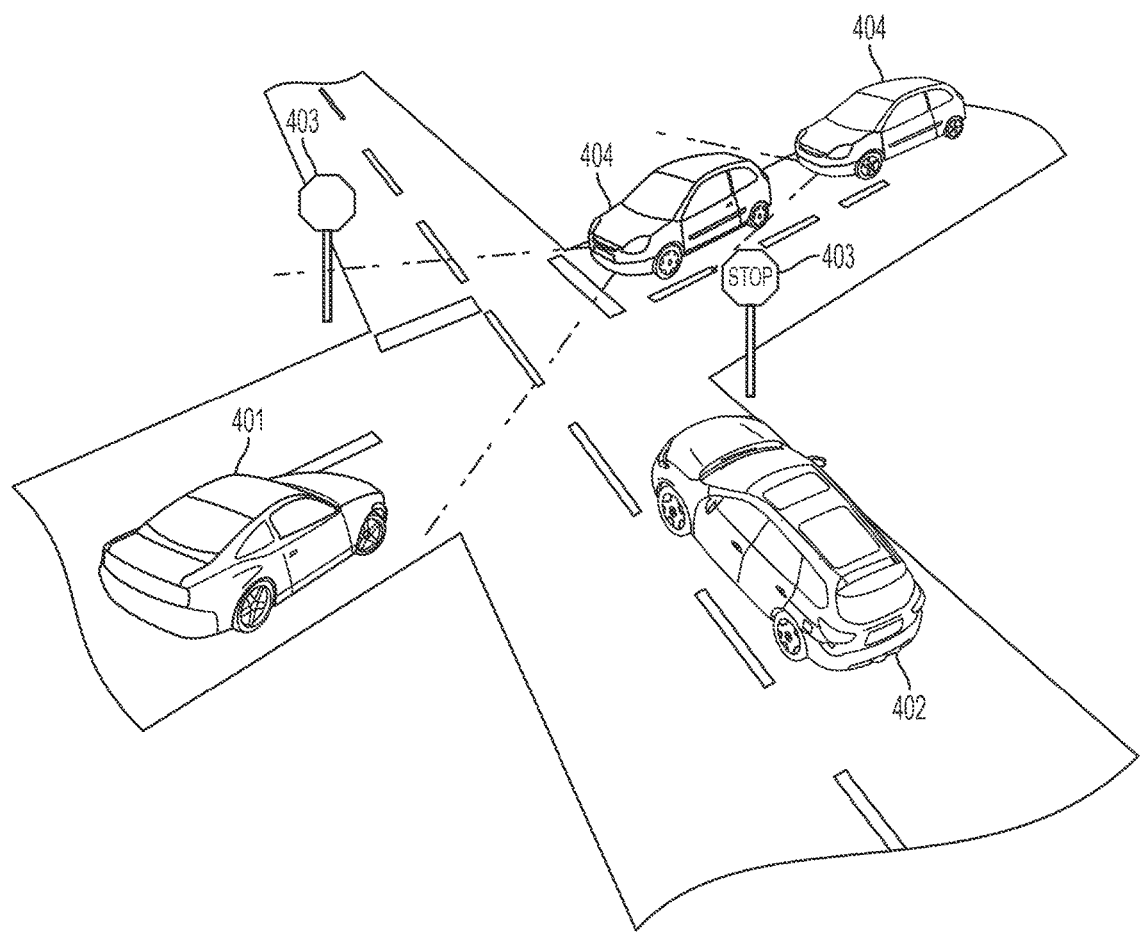
FIG. 4 illustrates a representative embodiment of a stop/start vehicle located on a learned vehicle route according to the present disclosure.

FIG. 4 illustrates an example of how an embodiment of the system or method illustrated in FIG. 3 may be implemented by vehicles 401 and 402, each equipped with a system according to embodiments of the present disclosure. During a vehicle drive cycle, the driver of stop/start vehicle 401 initiates a left turn. In this example, the left turn is initiated at an intersection controlled by 2-way stop signs 403. Prior to completing the left turn, the driver stops to wait for a gap in the stream of traffic 404. The stop/start system may issue an auto stop command according to the default stop/start logic if the wait exceeds a threshold. Sensors, including RADAR, LiDAR, or cameras, detect the stream of traffic 404. Once there is a gap in stream of traffic 404, the driver actuates the accelerator and completes the turn. If the engine has been auto stopped, it will be auto started when the driver actuates the accelerator. Controllers will learn the location and add it to a database of locations where the vehicle has crossed a stream of traffic. In one embodiment, the learned route or locations may include associated day, date, and/or time of occurrence that may be used to detect patterns that are specific to a particular day or time. Similarly, patterns or routes may be associated with a particular driver using a button to select "driver 1" or "driver 2", or a user interface, such as a vehicle infotainment system, for example. During a subsequent drive cycle, the vehicle approaches the same intersection. The vehicle's location will be detected by the positioning system and compared to the database of learned locations where the vehicle has crossed a stream of traffic. Because this location has been previously stored in the database, controllers will command the stop/start system to disable the auto stop function. In this manner there will be no delay when the driver actuates the accelerator pedal to complete the left turn because the engine has not auto stopped.

Similarly, as vehicle 402 waits at stop sign 403 for a break in stream of traffic 404, the stop/start system may issue an auto stop command according to the default stop/start logic. Sensors, including RADAR, LiDAR, or cameras, may be used to detect the cross traffic. When there is a gap in stream of traffic 404, the driver will actuate the accelerator to proceed through the intersection. If the engine has been auto stopped, it will be auto started when the driver actuates the accelerator. Controllers will learn the location and add it to a database of locations where the vehicle has crossed a stream of traffic. During a subsequent drive cycle, the vehicle approaches the same stop sign 403. The vehicle's location will be detected by the positioning system and compared to the database of learned locations where the vehicle has crossed a stream of traffic. Because this intersection corresponds to a previously learned location, controllers will command the stop/start system to disable or inhibit the auto stop function for a predetermined period of time, or until the vehicle location changes, depending on the particular application and implementation. As such, there will be no delay when the driver actuates the accelerator pedal to proceed through the intersection because the engine has not auto stopped.

Figure 5A:
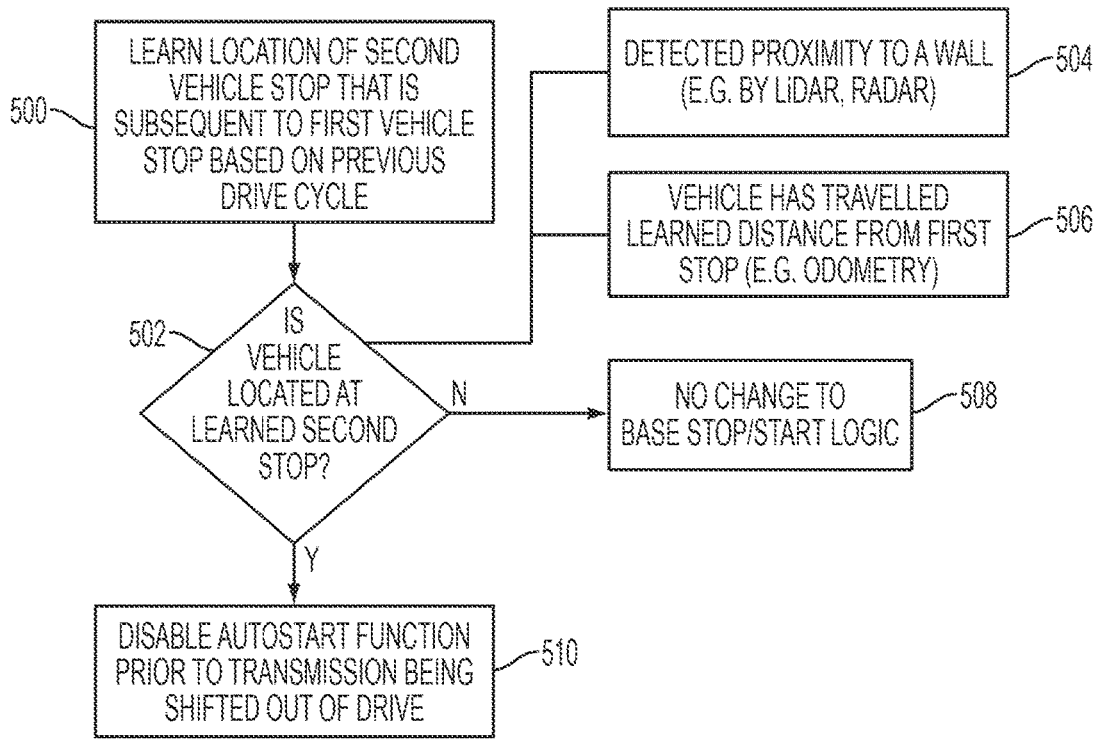
FIGS. 5a-b are flowcharts illustrating embodiments of a system or method for controlling a start/stop vehicle in response to a learned vehicle route that includes a second vehicle stop subsequent to a first vehicle stop according to the present disclosure.

Another embodiment of a system or method for controlling a stop/start vehicle according to the present disclosure will be described with reference to FIGS. 1 and 5a. A vehicle route is learned that includes the location of a second stop that is subsequent to a first vehicle stop, as illustrated in block 500. This driving pattern may occur, for example, when a driver pulls a vehicle up to a garage, activates a garage door opener, and waits for the garage door to open fully before proceeding to park the vehicle in the garage. This pattern may also occur when a driver pulls a vehicle up to the gate of a gated community, activates the gate, waits for the gate to open, and then drives the rest of the way to a house. The locations of the first and second stops may be detected by positioning system 110. The locations of the first and second stops may be learned in response to the vehicle encountering this driving pattern at the same location a threshold number of times. The learned locations may be stored in a database of such locations.

A determination is made of whether the vehicle is located at a learned second stop, as illustrated by block 502. This determination may be performed based upon a vehicle location as detected by positioning system 110. The determination may also be confirmed based on other inputs. For example, the determination may be made based upon a detected vehicle proximity to a wall or other barrier, such as the inside of a garage, as illustrated in block 504. This detection may be performed by sensor 108 and may comprise using LiDAR, RADAR, or other sensors as appropriate. The determination may also be based on learning the distance from the first stop to the second stop and verifying that the vehicle has travelled that distance, as illustrated in block 506. The verification may be performed by measuring the distance using odometer 112, which may be more accurate than a GPS or other position signal over short distances or within a covered structure such as a garage. If a determination is made that the vehicle is not located at a learned second stop, then the stop/start logic is left unmodified, as illustrated in block 508. If a determination is made that the vehicle is located at a learned second stop, then the auto start function is disabled prior to the vehicle transmission 114 being shifted out of drive, as illustrated in block

510. This may be performed by stop/start system 104 in response to a signal from controllers 106. In this way, if the engine is auto stopped before the transmission 114 is shifted out of Drive, the vehicle will not be auto started when the transmission 114 is shifted.

The following is an example of how the embodiment of a system or method as illustrated in FIG. 4a may operate. During a vehicle drive cycle, a vehicle pulls up to a garage, stops while the garage door opens, pulls forward into the garage, and reaches a final stopping point. The driver will shift the transmission out of Drive and into Park and then key-off or otherwise shut-off the vehicle. If the stop/start system has auto stopped the engine prior to the transmission being shifted, the engine will be unnecessarily auto started when the transmission is shifted into Park. After repeating this pattern at least a threshold number of drive cycles, the location of the second stop is learned. During subsequent drive cycles, after the vehicle arrives at the garage and stops while the garage door opens, the controllers 106 will determine that the vehicle is approaching the second stop based on a combination of measured distance from the first stop, a detected proximity of the garage wall, and the vehicle location as detected by the positioning system. Once the vehicle is located at the second stop, controllers will command the stop/start system to temporarily disable or inhibit the auto start function. Thus, if the engine is auto stopped prior to the driver moving the transmission out of Drive, the stop/start system will not auto start the engine when the driver does so, thereby eliminating unnecessary restarts.

In various embodiments, the system or method may also include a device to enable the driver to override or remove a previously learned location or behavior. Similarly, a device may be provided to enable the driver to reset or restart the system by clearing or otherwise removing all of the previously learned locations and/or system responses (i.e. inhibit auto start, inhibit auto stop, and/or both).

Figure 5B:
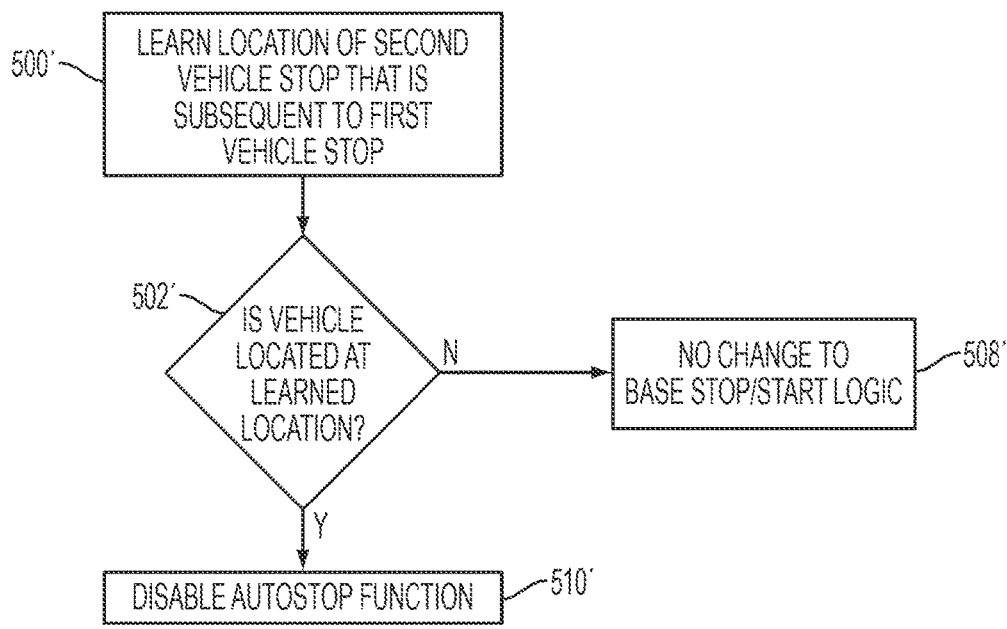

FIG. 5b illustrates a variation of the embodiment illustrated in 5a. A vehicle route is learned that includes the location of a second stop that is subsequent to a first vehicle stop, as illustrated in block 500'. Then, a determination is made of whether the vehicle is located at a learned second stop, as illustrated by block 502'. This determination may be performed based upon similar factors as described above with respect to FIG. 5a. If a determination is made that the vehicle is not located at a learned second stop, then the usual stop/start logic is not affected, as illustrated in block 508'. If a determination is made that the vehicle is located at a learned second stop, then the auto stop function is inhibited or disabled, as illustrated in block 510'. In this way, the engine will not auto stop while the vehicle is stopped, thus avoiding an unnecessary auto start when the transmission is shifted out of gear.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

As can be seen from the various embodiments, the systems and methods for controlling a vehicle having auto stop/start functionality according to the present disclosure may provide associated advantages relative to prior art implementations. For example, various embodiments may prevent unnecessary engine restarts and reduce associated engine wear and improve fuel economy. Other embodiments prevent engine auto stops in situations where a driver may need quick acceleration or turning control to improve vehicle performance.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling an auto stop/start vehicle comprising:
   selectively disabling auto stop/start functions in response to a detected vehicle position relative to an automatically learned vehicle route comprising a vehicle parking location at a second vehicle stop within a learned distance subsequent to a first vehicle stop, the selective disabling comprising disabling an auto start in response to a transmission being shifted out of drive and a detected vehicle location at the second stop.

2. The method of claim 1, wherein the disabling the auto start function is further in response to a detected vehicle proximity to a wall.

3. The method of claim 2, wherein detecting a vehicle proximity to a wall comprises using at least one of RADAR and LiDAR.

4. The method of claim 1, further comprising measuring the distance between the first vehicle stop and the second vehicle stop using a vehicle odometer.

5. A system for controlling an internal combustion engine comprising:
   a controller configured to automatically learn a vehicle route including a parking location at a second vehicle stop within a learned distance of a first vehicle stop based on previous drive cycles; and a stop/start system programmed to selectively disable an auto start in response to a transmission being shifted out of drive and a detected vehicle position relative to the parking location.

6. The system of claim 5, wherein the vehicle route comprises a location where the vehicle has previously crossed a detected stream of traffic, and wherein the selective disabling comprises disabling the auto stop function in response to a detected vehicle approach to the location where the vehicle has previously crossed a detected stream of traffic.

7. The system of claim 6, wherein the location where the vehicle has previously crossed a detected stream of traffic is a location where the vehicle has previously detected oncoming traffic and made a left turn.

8. The system of claim 6, wherein the location where the vehicle has previously crossed a detected stream of traffic is an intersection where the vehicle has previously detected cross traffic.

9. The system of claim 5, wherein the disabling the auto start function is further in response to a detected vehicle proximity to a wall.

10. The system of claim 5, wherein the stop/start system is further configured to measure the distance between the first vehicle stop and the second vehicle stop using a vehicle odometer.

* * * * *